United States Patent
Faruque et al.

(10) Patent No.: US 11,285,906 B1
(45) Date of Patent: Mar. 29, 2022

(54) INFLATABLE DEVICE FOR DRIVER AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/077,078

(22) Filed: Oct. 22, 2020

(51) Int. Cl.
*B60R 21/203* (2006.01)
*B60R 21/231* (2011.01)

(52) U.S. Cl.
CPC .......... *B60R 21/231* (2013.01); *B60R 21/203* (2013.01); *B60R 2021/23107* (2013.01); *B60R 2021/23169* (2013.01)

(58) Field of Classification Search
CPC ............... B60R 21/203; B60R 21/231; B60R 2021/23107; B60R 2021/23169
USPC ........................................... 280/731
See application file for complete search history.

(56) References Cited

U.S. PATENT DOCUMENTS

| | | | |
|---|---|---|---|
| 5,529,337 A | 6/1996 | Takeda et al. | |
| 5,556,056 A | 9/1996 | Kalberer et al. | |
| 7,631,891 B2 | 12/2009 | Washino | |
| 9,180,834 B1* | 11/2015 | Le | B60R 21/215 |
| 9,758,121 B2 | 9/2017 | Paxton et al. | |
| 9,845,067 B2 | 12/2017 | Morris et al. | |
| 2004/0007856 A1* | 1/2004 | Enders | B60R 21/235 |
| | | | 280/730.1 |
| 2005/0121889 A1 | 6/2005 | Enders et al. | |
| 2006/0197324 A1* | 9/2006 | Klinkenberger | B60R 21/203 |
| | | | 280/731 |
| 2010/0229674 A1 | 9/2010 | Tanaka | |
| 2017/0072891 A1* | 3/2017 | Paxton | B60R 21/203 |
| 2017/0174171 A1 | 6/2017 | Dennis et al. | |
| 2017/0355341 A1 | 12/2017 | Keyser et al. | |
| 2018/0208143 A1* | 7/2018 | Fischer | B60R 21/203 |
| 2018/0215339 A1 | 8/2018 | Nakanishi et al. | |
| 2019/0152359 A1* | 5/2019 | Spahn | B60N 2/4279 |
| 2019/0161044 A1* | 5/2019 | Schneider | B60R 21/203 |
| 2019/0256032 A1* | 8/2019 | Faruque | B60R 21/013 |

FOREIGN PATENT DOCUMENTS

| JP | 2004175150 A | * | 6/2004 |
|---|---|---|---|
| JP | 4613913 A | | 8/2008 |

* cited by examiner

*Primary Examiner* — Keith J Frisby
(74) *Attorney, Agent, or Firm* — Frank A. MacKenzie; Bejin Bieneman PLC (57) ABSTRACT

An assembly for a vehicle includes a steering wheel having a hub, an airbag supported by the hub and inflatable to an inflated position, and an inflatable device supported by the hub and inflatable to an inflatable position. The inflatable device defines an inflation chamber. The inflatable device is a thermoplastic elastomer (TPE).

20 Claims, 7 Drawing Sheets

INFLATABLE DEVICE FOR DRIVER AIRBAG

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger cabins of vehicles. Vehicles typically include a driver airbag mounted in the steering wheel. Upon inflation, a rim of the steering wheel may act as a reaction surface for the driver airbag.

DETAILED DESCRIPTION

An assembly includes a steering wheel having a hub, an airbag supported by the hub and inflatable to an inflated position, and an inflatable device supported by the hub and inflatable to an inflated position. The inflatable device defines an inflation chamber and is a thermoplastic elastomer.

The steering wheel includes a rim, the rim being between the airbag and the inflatable device when the airbag and the inflatable device are in an inflated position.

The rim may be non-circular.

The assembly may include an instrument panel, the inflatable device being between the steering wheel and the instrument panel.

The inflatable device may include an outward panel, an inward panel between the outward panel and the hub, and a side panel extending from the inward panel to the outward panel, the side panel being folded when the inflatable device is in an uninflated position. The side panel may be an endless loop between the outward panel and the inward panel. The outward panel may be thicker than the side panel. The inward panel may be thicker than the side panel. The outward panel may be flush with the hub in the uninflated position. The assembly may include a tear seam between the outward panel and the hub. The hub may define a recess and the inflatable device may be disposed in the recess. The outward panel may be arcuate about the hub in the inflated position. The steering wheel includes a rim and the side panel may be planar and abut the rim in the inflated position.

The assembly may include a second inflatable device supported by the hub and inflatable to an inflated position, the second inflatable device defining a second inflation chamber and being a thermoplastic elastomer. The inflatable device may be fluidly isolated from the second inflatable device. The airbag may abut the inflatable device and the second inflatable device when in the inflated position. The hub may define a recess extending endlessly around the hub and the inflatable device and the second inflatable device may be disposed in the recess.

The airbag may be woven fabric.

The inflatable device may be configured to extend into a knee area of a passenger cabin.

With reference to the Figures, wherein like numerals indicate like parts throughout the several views, an assembly 10 for a vehicle 12 is generally shown. The assembly 10 includes a steering wheel 14 having a hub 16, an airbag 18 supported by the hub 16 and inflatable to an inflated position, and an inflatable device 22 supported by the hub 16 and inflatable to an inflated position. The inflatable device 22 defines an inflation chamber 24. The inflatable device 22 is a thermoplastic elastomer (TPE).

The inflatable device 22 acts as a reaction surface for the airbag 18 in the event of an impact of the vehicle 12. The inflatable device 22 may limit rotation of the airbag 18 by supporting the airbag 18 in the event of an impact to the vehicle 12. Since the inflatable device 22 provides a reaction surface for the airbag 18, the airbag 18 may be used with a non-circular steering wheel 14, as discussed below.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 defines a passenger cabin 28 to house occupants, if any, of the vehicle 12. The passenger cabin 28 may extend across the vehicle 12, i.e., from one side to the other side of the vehicle 12. The passenger cabin 28 includes a front end and a rear end with the front end being in front of the rear end during forward movement of the vehicle 12.

The vehicle 12 may include an instrument panel 20. The instrument panel 20 may be disposed at front end of the passenger cabin 28. The instrument panel 20 may support vehicle controls, including the steering wheel 14. The instrument panel 20 may extend across the front end of the passenger cabin 28 from one side of the vehicle 12 to the other side of the vehicle 12.

The vehicle 12 includes a steering system (not numbered). The steering system controls the turning of the wheels. The steering system is in communication with and receives input from the steering wheel 14. The steering system may include a rack-and-pinion system with electric power-assisted steering, a steer-by-wire system, as are both known in the art, or any other suitable system. The steering wheel 14 allows an operator to steer the vehicle 12 by transmitting rotation of the steering wheel 14 to movement of a steering rack. The steering system includes a steering column supporting the steering wheel 14. The steering system may include a steering column shroud 58 covering the steering column in the passenger cabin 28. The steering column shroud 58 is between the instrument panel 20 and the inflatable device 22, and the inflatable device 22 is between the airbag 18 and the steering column shroud 58.

Figure 1:
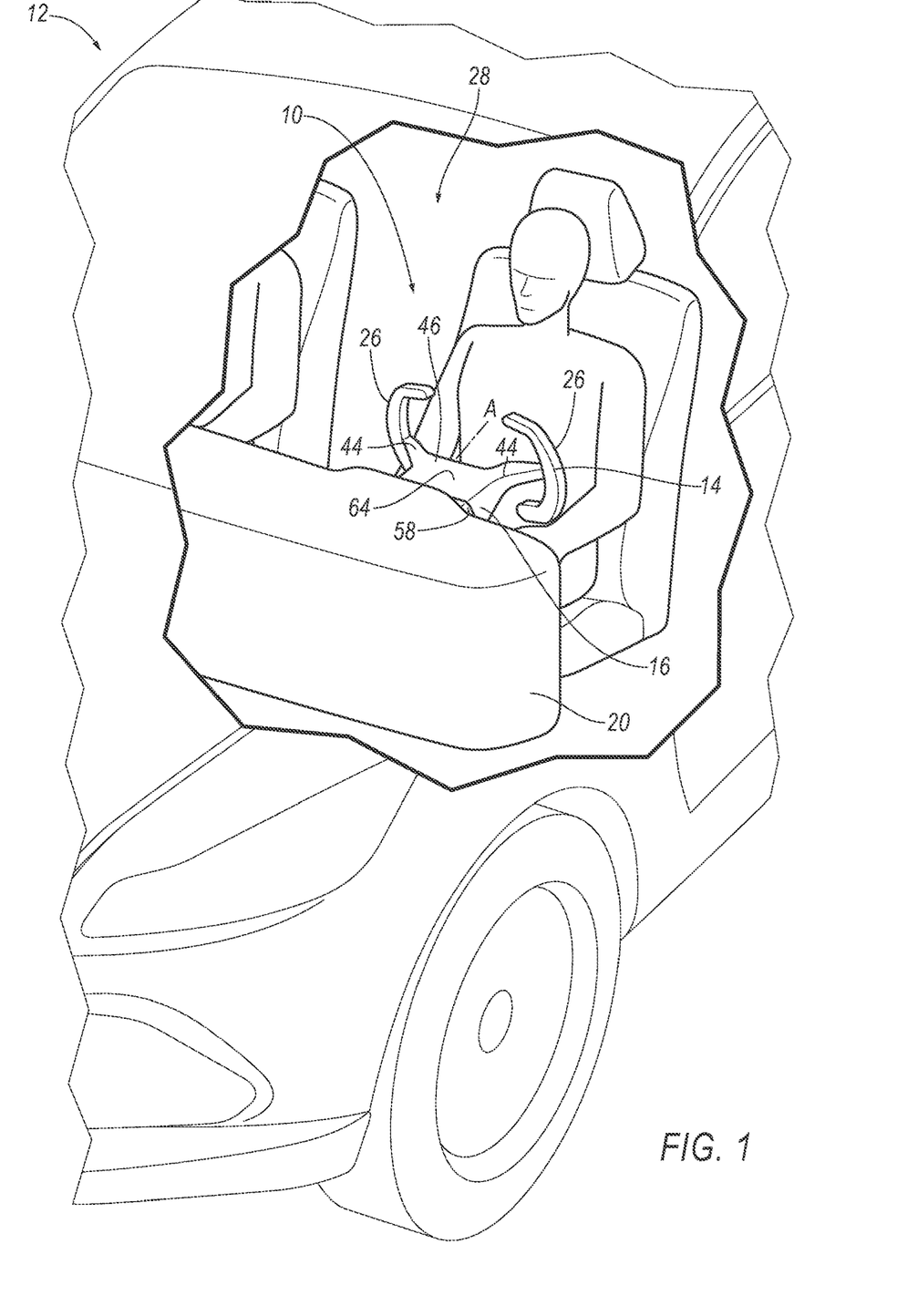
FIG. 1 is a cut-away showing a steering wheel and an instrument panel.
Figure 2:
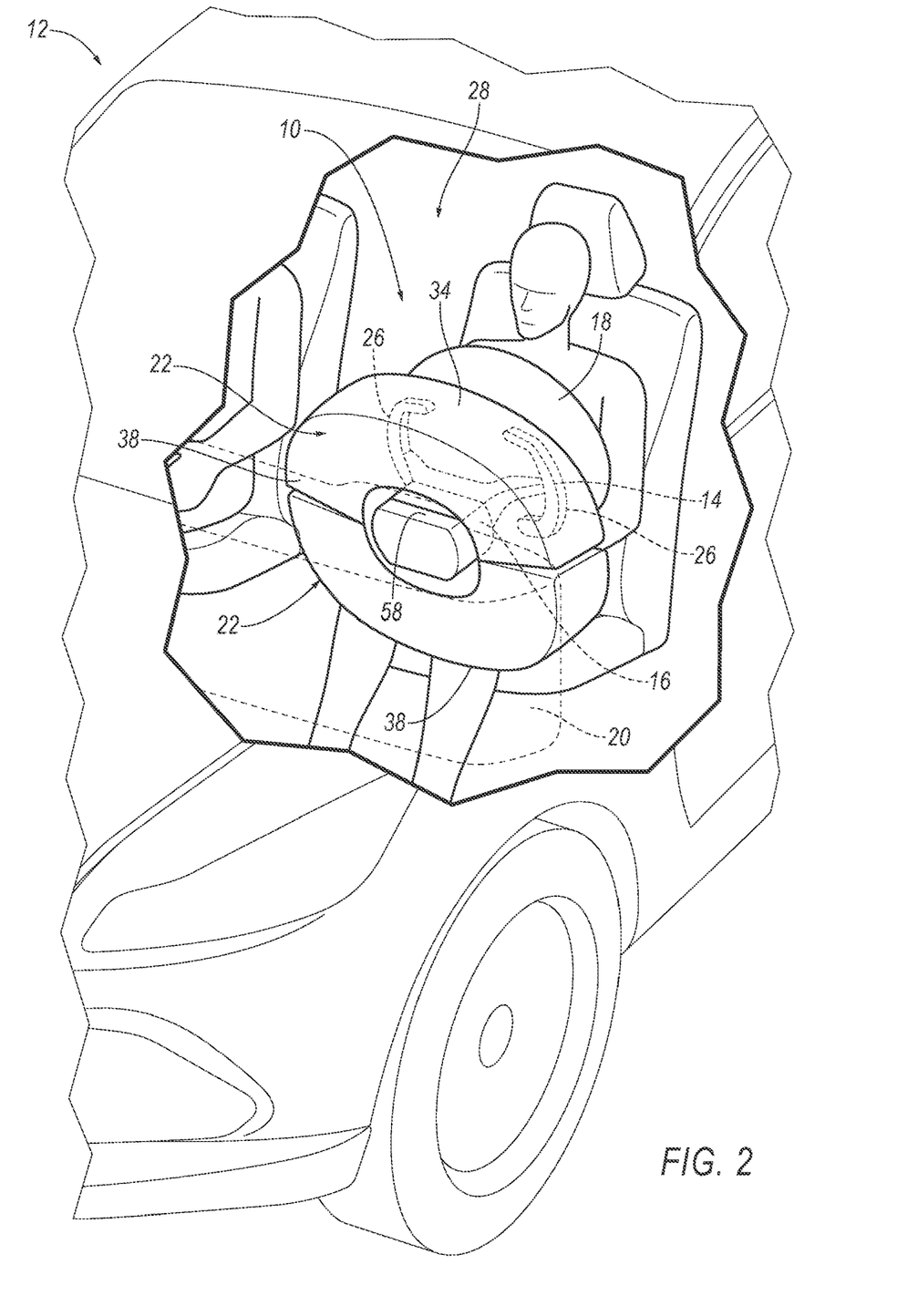
FIG. 2 is the cut-away view of FIG. 1 with an airbag and inflatable devices extending from the steering wheel in inflated positions.
Figure 3A:
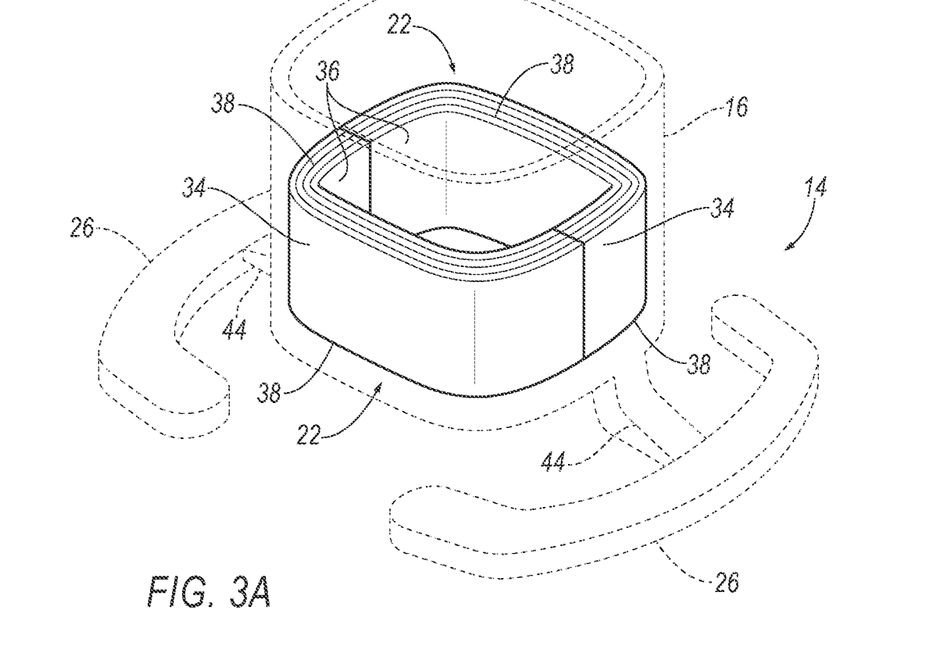
FIG. 3A is a perspective view of the steering wheel with outer surfaces shown in broken lines to show the inflatable devices.
Figure 3B:
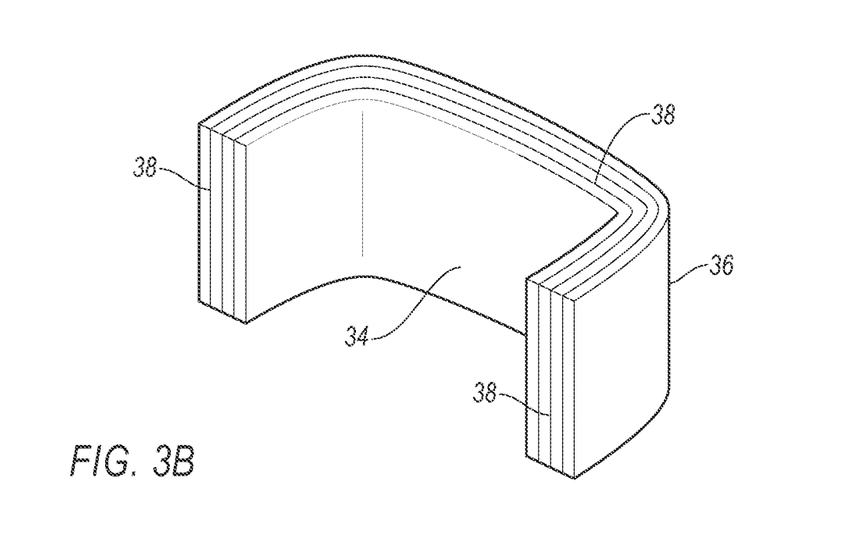
FIG. 3B is a perspective view of the inflatable device in the uninflated position.
Figure 4:
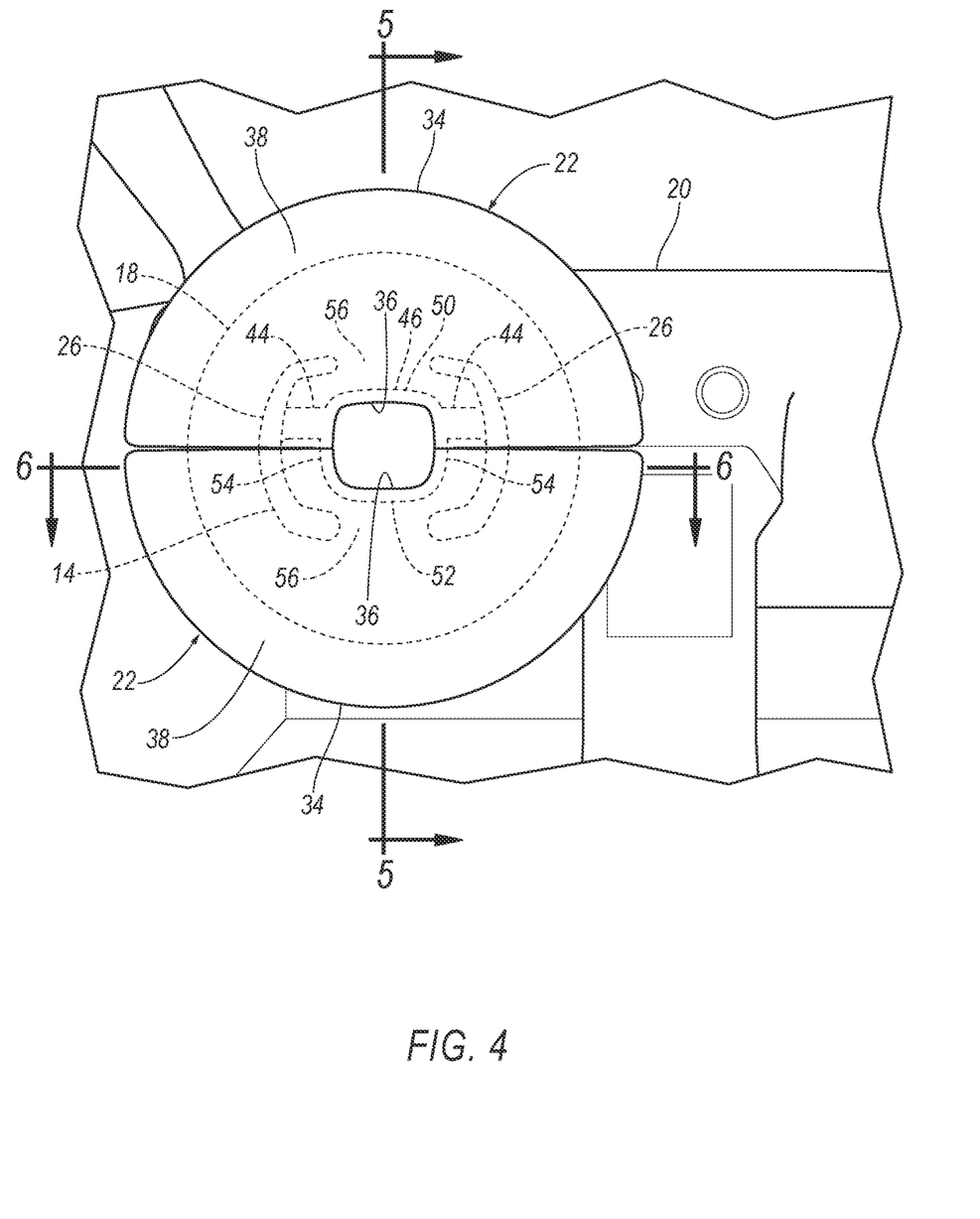
FIG. 4 is a front view of the steering wheel and the instrument panel with the airbag and the inflatable devices in the inflated positions.

With reference to FIGS. 1-3, the hub 16 of the steering wheel 14 is rotatable about a rotational axis A (identified in FIG. 1). The rotational axis A generally extends in a vehicle longitudinal direction. As an operator rotates the steering wheel 14 to turn the vehicle 12, the hub 16 rotates about the rotational axis A.

The steering wheel 14 includes a rim 26 supported by the hub 16. The rim 26 may be spaced from the hub 16. Specifically, the steering wheel 14 may include a space between the rim 26 and the hub 16 so that the rim 26 may be gripped by the driver.

The rim 26 is supported by the hub 16. The rim 26 is spaced radially from the hub 16. The rim 26 may include multiple segments spaced from the hub 16 and spaced from each other, e.g., paddles shown in the Figures, that may be gripped by a vehicle driver. In such an example, the steering wheel 14 may include two paddles spaced from each other in a cross-vehicle direction when the steering wheel 14 is steered straight. In such an example, the steering wheel 14 is non-circular, as described further below. The hub 16 may be centrally disposed relative to the rim 26.

The steering wheel 14 may include one or more arms 44 extending from the hub 16 to the rim 26. For example, as shown in the Figures, the steering wheel 14 includes a pair of arms 44 extending from the hub 16 to the rim 26. The arms 44 may extend from the hub 16 to the rim 26, e.g., to the paddles. The steering wheel 14 may include any suitable number of arms 44 extending from the hub 16 to the rim 26. The arms 44 may extend radially outwardly relative to the rotational axis A from the hub 16 to the rim 26. When the airbag 18 and the inflatable device 22 are in the inflated position, the arms 44 are between the airbag 18 and the inflatable device 22. The airbag 18 and the inflatable device 22 may abut the arms 44 when the airbag 18 and the inflatable device 22 are in the inflated positions.

The steering wheel 14 may be non-circular, as shown in the Figures. Specifically, the rim 26 may be non-circular circumferentially about the hub 16. As one example, the rim 26 may be longer in one direction than another. As another example in which the rim 26 is non-circular, the rim 26 may include at least two paddles that are discontinuous relative to each other about the hub 16 and spaced from the hub 16 in a cross-vehicle direction when the steering wheel 14 is steered straight. As other examples of the rim 26 being non-circular, the rim 26 may be endless and be, e.g., oval, rectangular, rounded rectangular etc. In other examples the rim 26 may be circular, i.e., a ring.

The steering wheel 14, e.g., the rim 26, includes a top 50, a bottom 52 spaced from the top 50, and two sides 54 spaced from each other and each extending from the top 50 to the bottom 52. Specifically, the rim 26 may define the top 50, bottom 52, and sides 54 of the steering wheel 14. The top 50 of the steering wheel 14 is above the bottom 52 of the steering wheel 14 when the steering wheel 14 is steered straight.

In the example shown in the Figures including the paddles, the paddles may be separated by a gap 56. The gap 56 may be positioned at the top 50 of the steering wheel 14 and/or at the bottom 52 of the steering wheel 14. The gaps 56 may be elongated in the cross-vehicle direction. In the example shown in the Figures, the rim 26 includes one gap 56 at the top 50, one gap 56 at the bottom 52, and two paddles at the sides 54, respectively.

The assembly 10 includes an airbag assembly (not numbered) supported by the hub 16 of the steering wheel 14.

Figure 5:
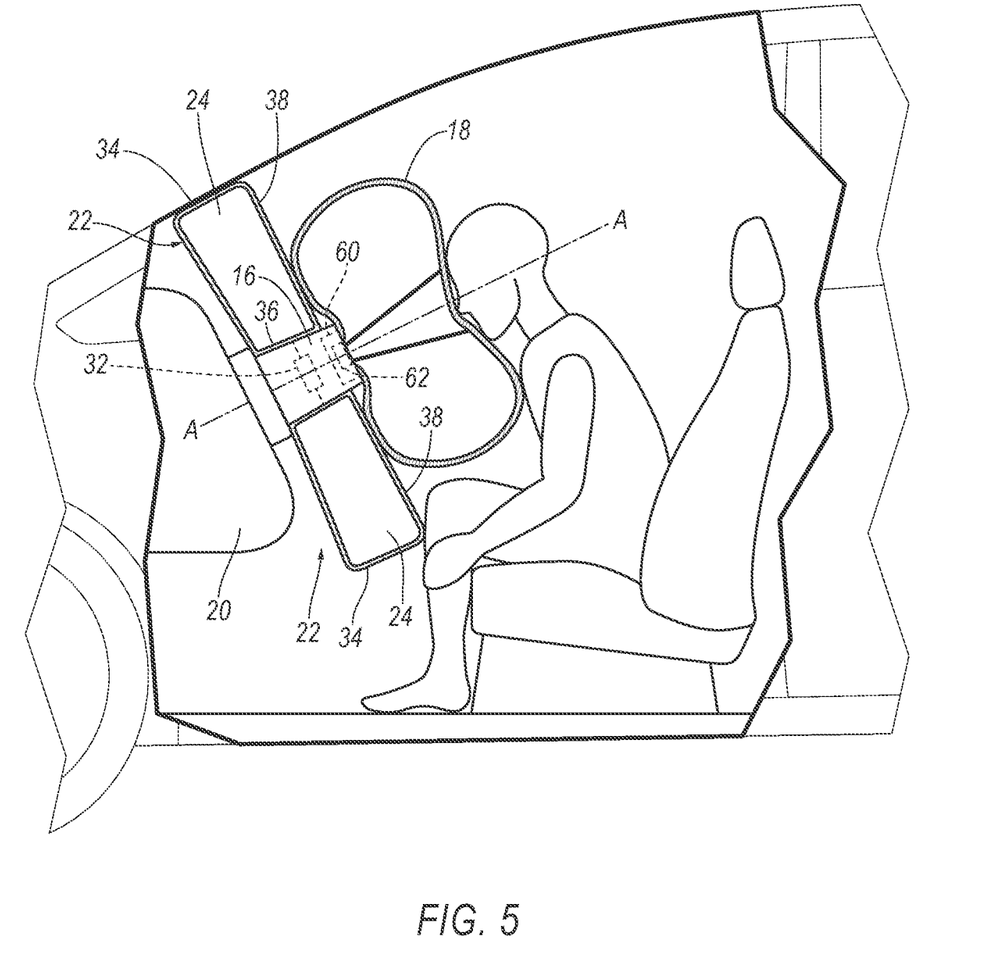
FIG. 5 is a side view of the vehicle with the airbag and the inflatable devices in the inflated position.

With reference to FIG. 5, the airbag assembly includes the airbag 18 and an inflator 62 and may include a housing 60. The inflator 62 inflates the airbag 18 from an uninflated position (FIG. 1) to an inflated position (FIG. 2). In an example in which the airbag assembly includes the housing 60, the inflator 62 of the airbag assembly may be supported by the housing 60. In an example including the housing 60, the housing 60 may be of any material, e.g., a rigid polymer, a metal, a composite, etc.

The airbag 18 is supported by the hub 16 and is inflatable from an uninflated position to an inflated position. As an example, the airbag assembly may include the housing 60 connected to the hub 16 with the airbag 18 supported by the housing 60. In such an example, the housing 60 of the airbag assembly is supported by the steering wheel 14. Specifically, the housing 60 is supported by the hub 16 of the steering wheel 14 and the airbag 18 is supported by the hub 16 through the housing 60. The airbag 18 inflates away from the hub 16 toward the driver in a vehicle-rearward direction.

The airbag 18 may be referred to as a driver airbag. The airbag 18 may be supported on the vehicle-rearward side of the steering wheel 14, i.e., the airbag 18 is supported by the hub 16 on the vehicle-rearward side of the steering wheel 14. As a driver turns the steering wheel 14 about the rotational axis A to turn the vehicle 12, the airbag 18 rotates about the rotational axis A along with the steering wheel 14.

The airbag 18 may be inflatable along the rotational axis A toward the rear end of the passenger cabin 28, i.e., the airbag 18 may extend into the passenger cabin 28 toward a driver seat when the airbag 18 is in the inflated position. When the airbag 18 inflates to the inflated position, the airbag 18 extends radially from the rotational axis A. The airbag 18 may extend radially outwardly relative to the rotational axis A farther than the rim 26 of the steering wheel 14 extends radially outwardly relative to the rotational axis A when the airbag 18 is in the inflated position.

The airbag 18 may be woven nylon yarn, for example, nylon 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 62 of the airbag assembly is in fluid communication with the airbag 18. The inflator 62 expands the airbag 18 with inflation medium, such as a gas, to move the airbag 18 from the uninflated position to the inflated position. The inflator 62 may be supported by any suitable component. For example, the inflator 62 may be supported by the housing 60, as described above. The inflator 62 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 62 may be, for example, at least partially in the inflation chamber of the airbag 18 to deliver inflation medium directly to the inflation chamber or may be connected to the inflation chamber through fill tubes, diffusers, etc.

With reference to FIGS. 3-6, the inflatable device 22 is supported by the hub 16. The inflatable device 22 may be disposed in the hub 16 in the uninflated position and extend from and remain supported by the hub 16 in the inflated position. The inflatable device 22 inflates radially away from the hub 16.

The assembly 10 may include more than one inflatable device 22. The example shown in the Figures, as an example, includes two inflatable devices 22, i.e., a first inflatable device 22 and a second inflatable device 22. In examples including more than one inflatable device 22, the inflatable devices 22 may have common design and function. In the example shown in the Figures, the inflatable devices 22 are mirror images of each other. In examples including multiple inflatable devices 22, the inflatable devices 22 may be fluidly isolated, i.e., the inflation chambers 24 of the inflatable devices 22 are not in fluid communication with each other.

The airbag 18 may abut the inflatable device 22 when in the inflated position. When both the airbag 18 and the inflatable device 22 are in the inflatable position, the airbag 18 contacts the side panel 38 of the inflatable device 22. This contact may allow the inflatable device 22 to act as a reaction surface to control the kinematics of a driver during impact of the driver against the airbag 18. For example, during a vehicle impact in which the driver is urged in a vehicle 12 forward direction, as the driver moves toward the instrument panel 20, the airbag 18 is pushed against the inflatable device 22 and the inflatable device 22 offers resistance to the vehicle 12 forward movement of the driver, thereby controlling the kinematics of the driver. The inflatable device 22 acts as a reaction surface because the material of the inflatable device 22, i.e., the thermoplastic elastomer, is more rigid than the material of the airbag 18 and/or because the inflatable device 22 abuts another component vehicle-forward of the inflatable device, e.g., the instrument panel 20.

Figure 6:
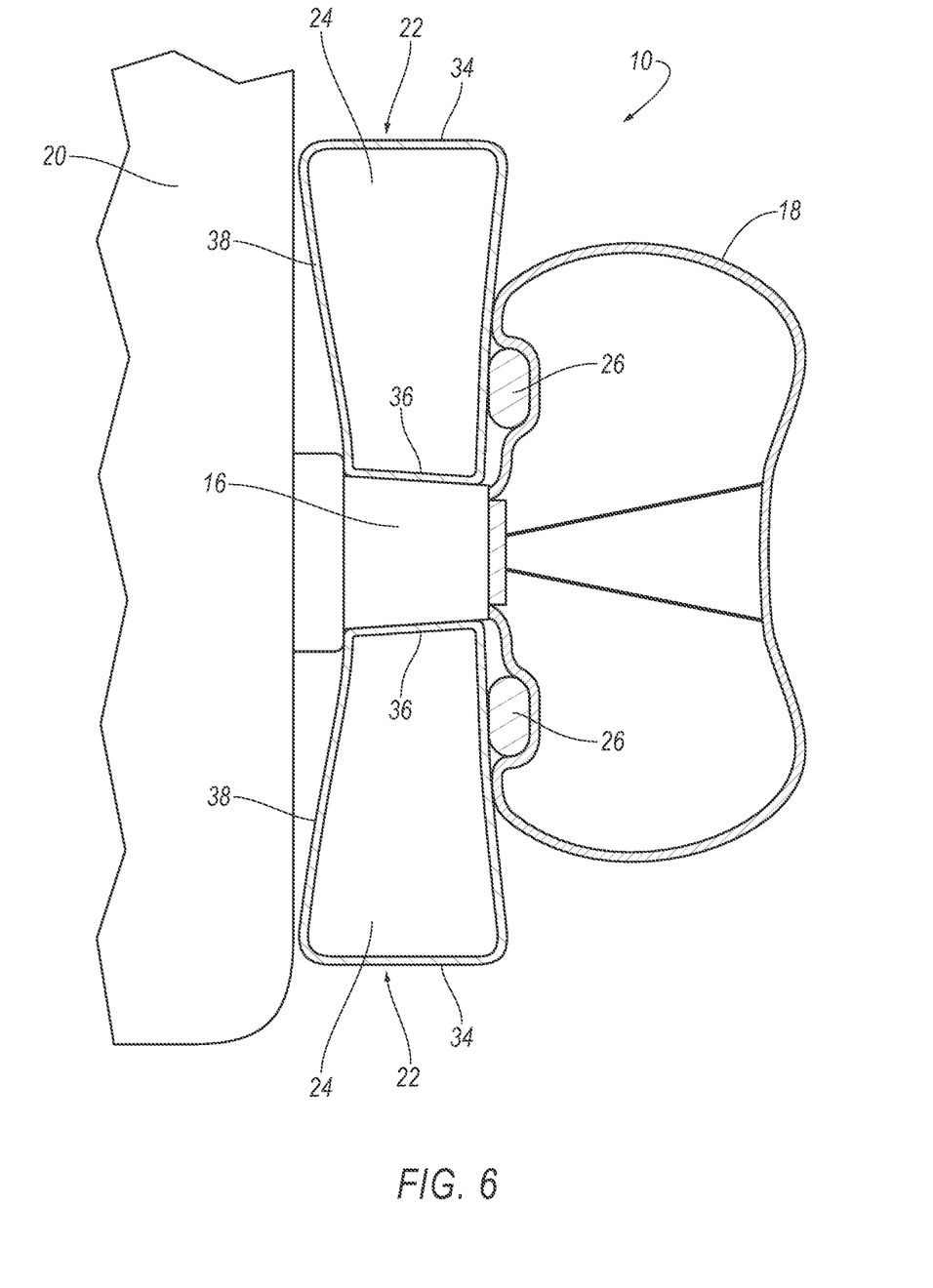
FIG. 6 is a side view of the instrument panel and steering wheel with the airbag and the inflatable devices in the inflated position and shown in cross-section.

The inflatable device 22 is between the rim 26 of the steering wheel 14 and the instrument panel 20 in both the uninflated position and the inflated position. Specifically, in the uninflated position, the rim 26 extends from the hub 16 vehicle forward of the location of the inflatable device 22 in the hub 16. FIG. 6 shows the inflatable device 22 between the rim 26 and the instrument panel 20.

The rim 26 is between the airbag 18 and the inflatable device 22 when the airbag 18 and the inflatable device 22 are in the inflated position. Specifically, the airbag 18 inflates vehicle-rearward from the steering wheel 14 and vehicle-rearward of the rim 26. The inflatable device 22 inflates radially from the steering wheel 14 vehicle-forward of the rim 26. The inflatable device 22 and the airbag 18 may both abut the rim 26 in the inflated position, as shown in FIG. 6.

As set forth above, the inflatable device 22 is a thermoplastic elastomer. Specifically, the inflatable device 22 has walls that are thermoplastic elastomer (TPE). The walls of the inflatable device 22 define the inflation chamber 24. A thermoplastic elastomer has both thermoplastic and elastomeric properties. Types of TPEs include styrenic block copolymers, thermoplastic olefins, elastomeric alloys, thermoplastic polyurethanes, thermoplastic copolyesters, and thermoplastic polyamides. The material of the walls of the inflatable device 22 is solid, not woven, fabric, etc. As an example, the inflatable device 22, and specifically the walls of the inflatable device 22 may be formed by injection molding.

The assembly 10 includes an inflator 32. The inflator 32 is in fluid communication with the inflation chamber 24. The inflation chamber 24 is filled with inflation medium that inflates the inflatable device 22. Specifically, the inflator 32 expands the inflation chamber 24 with inflation medium, such as a gas, to move the inflatable device 22 from the uninflated position to the inflated position. In examples including more than one inflatable device 22, the assembly 10 may include one inflator 32 that feeds each inflatable device 22 or may include multiple inflators 32 each dedicated to in inflatable device 22. The inflator 32 may be supported by any suitable component. For example, the inflator 32 may be supported by the hub 16. The inflator 32 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 32 may be, for example, at least partially in the inflation chamber 24 to deliver inflation medium directly to the inflation chamber 24 or may be connected to the inflation chamber 24 through fill tubes, diffusers, etc.

The inflatable device 22 includes an outward panel 34, an inward panel 36, and a side panel 38. The outward panel 34 forms the outermost surface of the inflatable device 22 with respect to the hub 16. The inward panel 36 is between the outward panel 34 and the hub 16. The inflatable device 22 may be connected to the hub 16 at the inward panel 36. The side panel 38 extends from the inward panel 36 to the outward panel 34. The side panel 38 may be an endless loop. The outward panel 34, inward panel 36, and side panel 38 may be unitary, i.e., a single, uniform piece of material with no seams, joints, fasteners, or adhesives holding them together. As an example, outward panel 34, the inward panel 36, and the side panel 38 may be formed together simultaneously as a single continuous unit, e.g., by injection molding. Non-unitary components, in contrast, are formed separately and subsequently assembled, e.g., by adhesive, welding, etc.

Figure 7:
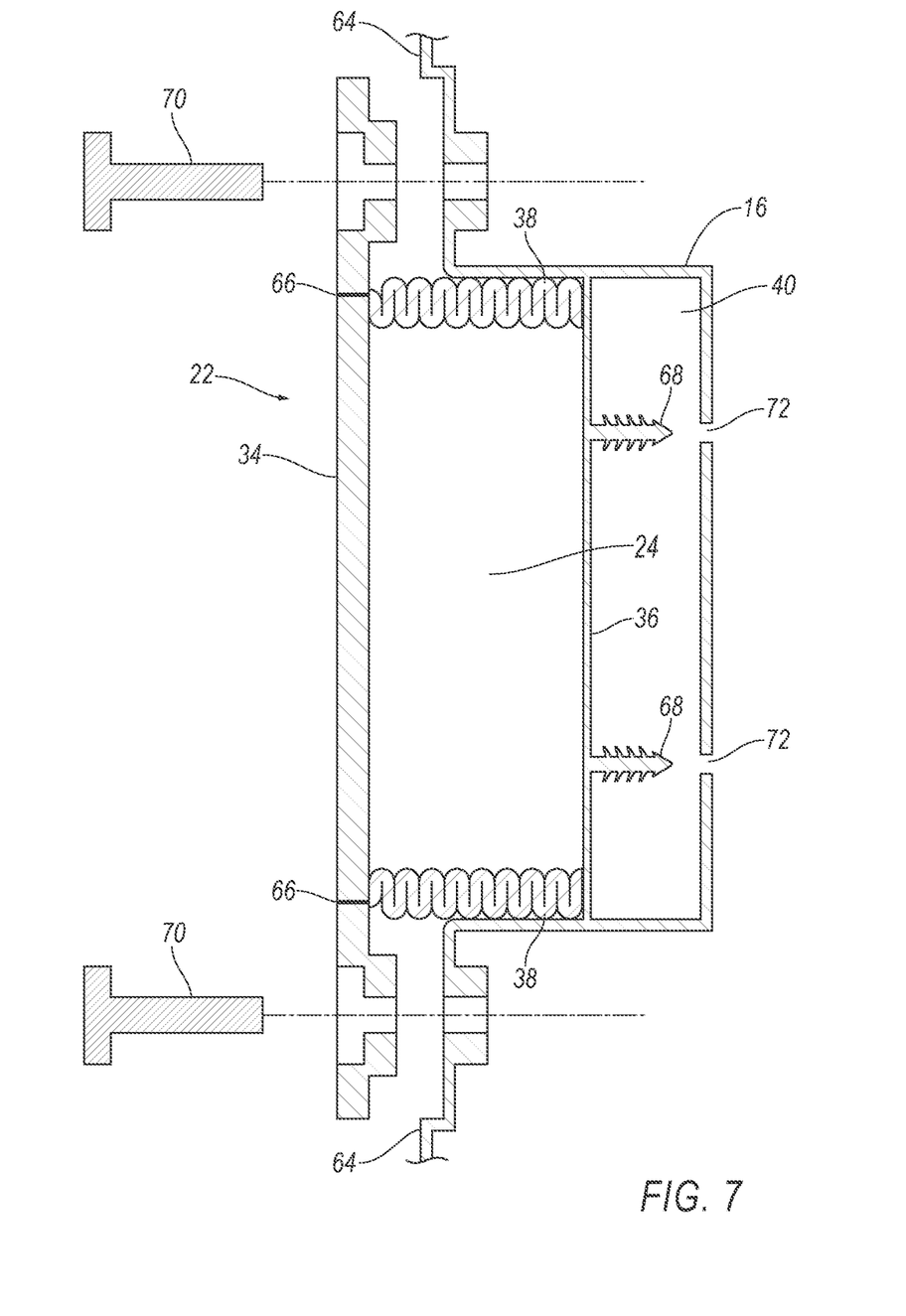
FIG. 7 is a cross-section of a portion of the steering wheel to show the inflatable device.

With reference to FIGS. 3 and 7, the side panel 38 is folded when the inflatable device 22 is in an uninflated position. The side panel 38 is folded in an accordion fashion. The folding of the side panel 38 compresses the inflatable device 22 and allows the inflatable device 22 to be packaged with the hub 16.

The outward panel 34 may be thicker than the inward panel 36 and/or the side panel 38. As an example, the outward panel 34 may have a wall thickness of 4-8 mm thick, the side panel 38 may have a wall thickness of 2-4 mm, and the side panel 38 may have a wall thickness of 2-4 mm.

The outward panel 34 may be arcuate about the hub 16 in the uninflated position and/or in the inflated position. Specifically, the outward panel 34 may curve circumferentially about the hub 16, e.g., about the rotational axis A. In the uninflated position, the outward panel 34 may follow contours of the hub 16, as described below. In the inflated position, the outward panel 34 may be semi-circular. In the example including two inflatable devices 22, the inflatable devices 22 may abut each other to, in combination, encircle the hub 16 about the rotational axis A. Specifically, in the uninflated position, the outward panels 34 may abut each other to encircle the hub 16. In the inflated position, portions of the side panels 38 may abut each other so that the inflatable devices 46, in combination, encircle the hub 16.

The outward panel 34 may be flush with an outer surface 64 of the hub 16 in the uninflated position, as shown in FIG. 3. Specifically, as shown in FIG. 7, the hub 16 may be recessed such that the outer surface 64 of the hub 16 is flush with the outward panel 34 when the inflatable device 22 is connected to the hub 16. In such an example, the hub 16 may have a recess 40 that receives the inflatable device 22. As set forth above, the side panel 38 may be folded in the uninflated position to accommodate for packaging in the recess 40 with the outward panel 34 flush with the outer surface 64 of the hub. The recess 40 may be endless around the hub 16. For example, in the example including two inflatable devices 22, the inflatable devices 22 may abut each other to extend endless around the hub 16 in the recess.

The outward panel 34 may follow the contours of the outer surface 64 of the hub 16. The outward panel 34 may have a class-A surface. Specifically, the outward panel 34 may match the appearance of the outer surface 64 of the hub 16 such that the inflatable device 22 is concealed in the uninflated position.

In one example, as shown in FIG. 7, the inflatable device 22 is fixed to the hub 16. In such an example, the inflatable device may have connections 68 that engage the hub 16 in the recess 40. For example, the connections 68 may be Christmas tree fasteners engageable with holes 72 in the hub. In such an example, the connections 68 may be unitary with the inward panel 36, as shown in FIG. 7. In addition or in the alternative, connections 70 may extend through the outward panel 34 and the outer surface 64 to engage the inflatable device 22 to the hub 16. As an example, the connections 70 may be threaded fasteners. In the example shown in FIG. 7, the outward panel 34 may have a tear seam 66 that allows the inflatable device 22 to release and expand to the inflated position. The tear seam 66 may be, for example, a line of decreased material thickness and/or perforations to induce tearing along the tear seam 66 when subjected to sufficient force.

As another example, the hub 16 and the inflatable device 22 may be unitary i.e., a single, uniform piece of material with no seams, joints, fasteners, or adhesives holding them together. As an example, hub 16 and the inflatable device 22 may be formed together simultaneously as a single continuous unit, e.g., by injection molding. In examples in which the hub 16 and the inflatable device 22 are unitary, the hub 16 and the inflatable device 22 may be joined at a tear seam. The tear seam may be, for example, a line of decreased material thickness and/or perforations to induce tearing along the tear seam when subjected to sufficient force.

The vehicle 12 may include a computer, e.g., a restraints control module. The computer may be a microprocessor-based computing device implemented via circuits, chips, or other electronic components. For example, the computer may include a processor, memory, etc. The memory of the computer may store instructions executable by the processor as well as data and/or databases. The processor is programmed to initiate an inflation of the airbag 18 and inflation of the inflatable device 22 in response to a vehicle impact. Specifically, the processor is programmed to activate the inflators 32, 62 in response to a vehicle impact.

The vehicle 12 may include an impact sensor (not shown). The impact sensor is programmed to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle 12.

The vehicle 12 may include a communication network. The communication network includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms. The computer, impact sensors, and inflators 32, 62 are in communication on the communication network.

During a vehicle impact detected by the impact sensors, the computer instructs the inflators 32, 62 to activate. The inflator 32 inflates the inflatable device 22 and the inflator 62 inflates the airbag 18. As described above, the inflatable device 22 acts as a reaction surface for the airbag 18 to position the airbag. Specifically, the inflatable device 22 retains the airbag 18 in a vehicle-rearward position of the inflatable device 22 to position the airbag 18 relative to an occupant and to control movement of the airbag 18 when impacted by an occupant so that the airbag 18 controls the kinematics of the occupant. The inflatable device 22 may control the kinematics of the occupant. For example, in an example shown in the Figures, one of the inflation devices 22 extends downwardly from the steering wheel 14 and controls the kinematics of the knees of the vehicle 12 occupant when in the inflated position. Specifically, the inflatable device 22 is configured to extend into a knee area of a passenger cabin 28. The knee area of the passenger cabin is the volume typically occupied by the knees of an occupant in the seat of the vehicle 12. Specifically, the knee area is between the inflatable device 22 in the inflated position and a seat bottom of the seat.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
a steering wheel having a hub;
an airbag supported by the hub and inflatable to an inflated position; and
an inflatable device supported by the hub and inflatable to an inflated position, the inflatable device defining an inflation chamber and being a thermoplastic elastomer;
the inflatable device including an outward panel, an inward panel between the outward panel and the hub, and a side panel extending from the inward panel to the outward panel, the side panel being folded when the inflatable device is in an uninflated position;
the side panel being an endless loop between the outward panel and the inward panel.

2. The assembly of claim 1, wherein the steering wheel includes a rim, the rim being between the airbag and the inflatable device when the airbag and the inflatable device are in an inflated position.

3. The assembly claim 1, wherein the rim is non-circular.

4. The assembly of claim 1, further comprising an instrument panel, the inflatable device being between the steering wheel and the instrument panel.

5. The assembly of claim 1, wherein the outward panel is thicker than the side panel.

6. The assembly of claim 1, wherein the inward panel is thicker than the side panel.

7. The assembly of claim 1, wherein the outward panel is flush with the hub in the uninflated position.

8. The assembly of claim 7, further comprising a tear seam between the outward panel and the hub.

9. The assembly of claim 7, wherein the hub defines a recess and the inflatable device is disposed in the recess.

10. The assembly of claim 1, wherein the outward panel is arcuate about the hub in the inflated position.

11. The assembly of claim 1, wherein the steering wheel includes a rim and the side panel is planar and abuts the rim in the inflated position.

12. The assembly of claim 1, further comprising a second inflatable device supported by the hub and inflatable to an inflated position, the second inflatable device defining a second inflation chamber and being a thermoplastic elastomer.

13. The assembly of claim 12, wherein the inflatable device is fluidly isolated from the second inflatable device.

14. The assembly of claim 12, wherein the airbag abuts the inflatable device and the second inflatable device when in the inflated position.

15. The assembly of claim 12, wherein the hub defines a recess extending endlessly around the hub and the inflatable device and the second inflatable device are disposed in the recess.

16. The assembly of claim 1, wherein the airbag is woven fabric.

17. The assembly of claim 1, wherein the inflatable device is configured to extend into a knee area of a passenger cabin.

18. An assembly, comprising:
a steering wheel having a hub;
an airbag supported by the hub and inflatable to an inflated position; and
an inflatable device supported by the hub and inflatable to an inflated position, the inflatable device defining an inflation chamber and being a thermoplastic elastomer;
the inflatable device including an outward panel, an inward panel between the outward panel and the hub, and a side panel extending from the inward panel to the outward panel, the side panel being folded when the inflatable device is in an uninflated position; and
the outward panel being flush with the hub in the uninflated position.

19. The assembly of claim 18, wherein the hub defines a recess and the inflatable device is disposed in the recess.

20. An assembly, comprising:
a steering wheel having a hub;
an airbag supported by the hub and inflatable to an inflated position;
an inflatable device supported by the hub and inflatable to an inflated position, the inflatable device defining an inflation chamber and being a thermoplastic elastomer; and
a second inflatable device supported by the hub and inflatable to an inflated position, the second inflatable device defining a second inflation chamber and being a thermoplastic elastomer;
the hub defining a recess extending endlessly around the hub, the inflatable device and the second inflatable device being disposed in the recess.

* * * * *